J. L. BERING.
SAFETY RAILWAY TRUCK AIR BRAKE APPLIANCE.
APPLICATION FILED JAN. 27, 1909.
932,675.
Patented Aug. 31, 1909.
2 SHEETS—SHEET 1.
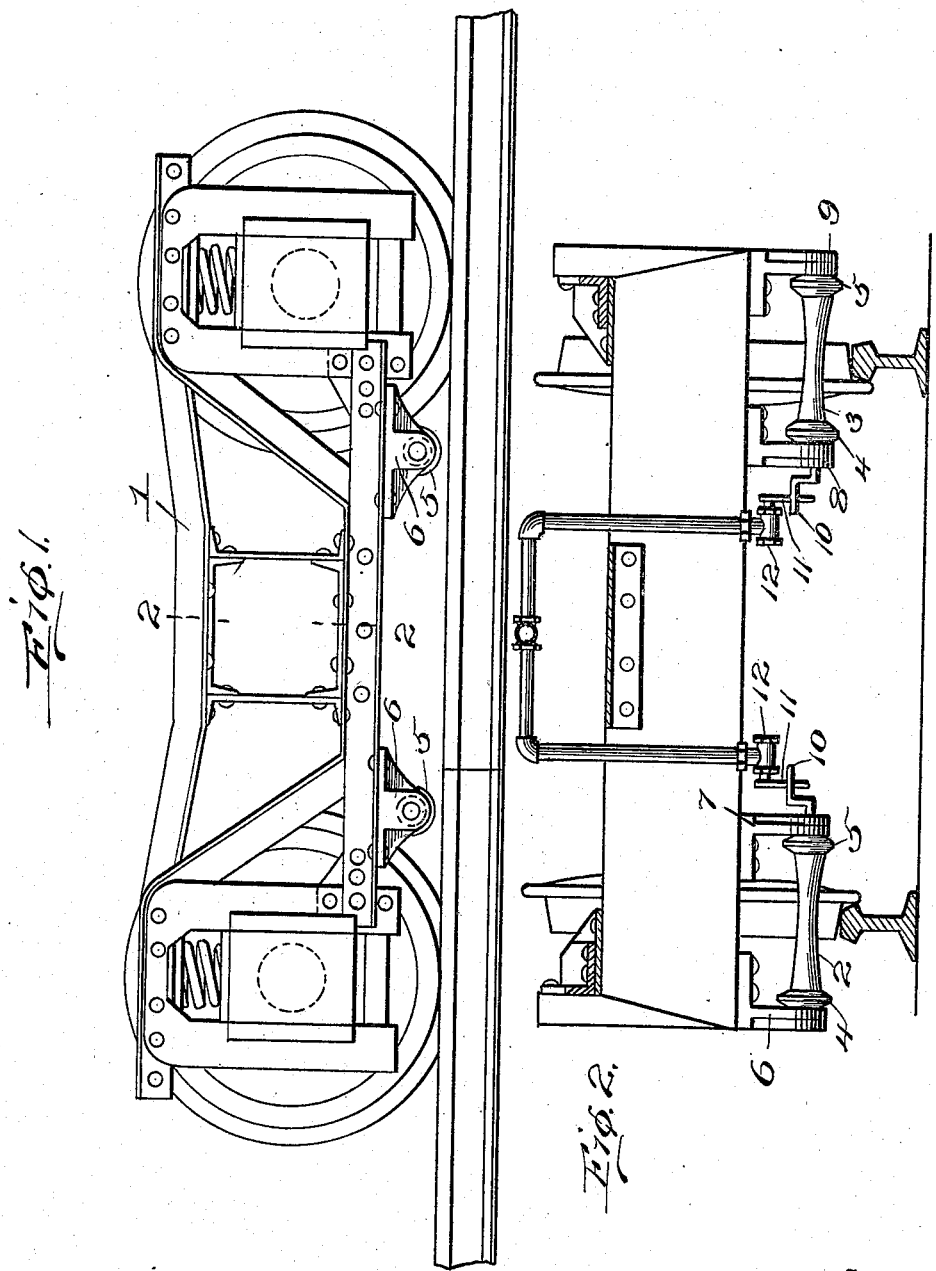

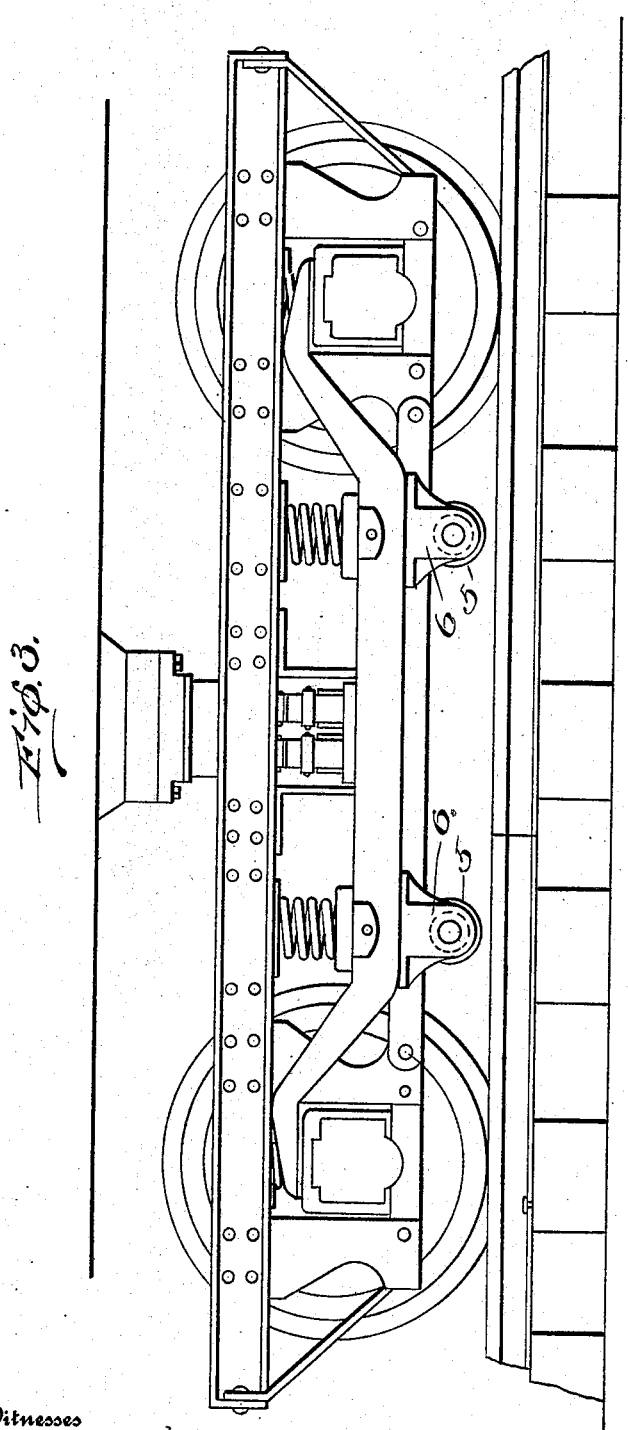

UNITED STATES PATENT OFFICE.

JOHN L. BERING, OF GAINESVILLE, TEXAS.

SAFETY RAILWAY-TRUCK AIR-BRAKE APPLIANCE.

932,675.  Specification of Letters Patent.  Patented Aug. 31, 1909.

Application filed January 27, 1909. Serial No. 474,475.

*To all whom it may concern:*

Be it known that I, JOHN L. BERING, a citizen of the United States, residing at Gainesville, in the county of Cooke and State of Texas, have invented certain new and useful Improvements in Safety Railway-Truck Air-Brake Appliances, of which the following is a specification.

This invention relates to improvements in safety devices for cars, and has for an object the provision of improved means for stopping the car upon the derailment of any truck or trucks without the loss of time and supporting it in an upright position upon derailment of any truck or trucks and for applying the air brake.

A further object of the invention is the arrangement of rollers either in the front or rear of the wheels of a truck and extending on each side thereof so that upon the derailment of the truck the rollers will engage the rails and will be rotated thereby, and means connecting the rollers with the air brake system that will open the air brake system upon the rotation of the rollers so that immediately upon the rotation of the rollers the brake will be applied for stopping the entire train.

With these and other objects in view the invention comprises certain novel constructions, combinations and arrangement of parts as will be hereinafter more fully described and claimed.

In the accompanying drawings: Figure 1 is a side elevation of a truck used on freight cars with the invention applied thereto. Fig. 2 is a section through Fig. 1 approximately on line 2—2 thereof. Fig. 3 is a side elevation of a passenger car truck with the invention applied thereto.

In securing the appliance embodying the features of the invention in place the same may be arranged upon the trucks of railroad cars, engines, electric cars, or any kind of car desired. In applying the same the rollers may be mounted at any desired place, either in the front or rear of the wheels, and the brackets varied in shape to accommodate the various constructions of trucks to which the same are applied, the only requisite being that the rollers be so mounted as to readily engage the track when the truck is derailed. In arranging the rollers the same are preferably positioned on the truck so as to extend substantially an equal distance on each side of the rails in order that the same may engage the rail regardless of the direction in which the truck jumps the track. Rigidly connected with each of the rollers is a crank that is adapted to engage a handle or lever on a valve interposed in the air brake system of the car so that when the truck has been derailed and the rollers are moving along the track the same will rotate the cranks connected thereto, which in turn will act upon the levers of the valves in the air brake system for opening the valve and for consequently applying the brakes upon the entire train.

In order that the invention may be more clearly understood an embodiment of the same is shown in the accompanying drawings in which—

1 indicates a truck particularly adapted for freight use upon which are mounted a plurality of rollers 2 and 3. The rollers 2 and 3 are preferably reduced centrally and taper toward each end. At the ends of the rollers are provided enlarged portions or flanges 4 and 5 for resisting removal of the rollers from the track when the same have been placed thereon. The rollers 2 are supported by any desired form of brackets 6 and 7 and rollers 3 are supported by any desired form of brackets 8 and 9. It will of course be understood that the brackets 6 and 7 and 8 and 9 may be varied in form for application of the rollers between the wheels of the truck as shown, or for applying the rollers in the front and rear of the truck as may be desired, the only function of the brackets being merely to support the rollers above the track and to rigidly hold the same in position so that when the truck has been derailed the rollers will engage the track and prevent the wheels of the truck from engaging the ties supporting the rails, and will prevent the truck from entirely leaving the track, thereby supporting the car in an upright position.

Rigidly secured to each of the rollers 2 and 3 is a crank 10 which is arranged to engage a valve lever 11 upon the rotation of the crank. The valve lever 11 is connected with valve 12 and when the same is moved by cranks 10 valve 12 will be opened for exhausting the air from the brake system of the train. By arranging a valve for each of the rollers 2 and 3 several valves will be open at one time when a single truck is derailed so that the air brake system will be exhausted almost instantly and the brakes applied without delay, though if desirable a less number of rollers might be supplied with cranks 10 for operating valve 12. By thus providing comparatively long rollers that extend upon each side of the track and comparatively near the track means are presented that will largely prevent a truck from entirely leaving the track, and thus prevent the coach carried by the truck from falling over. In practice it has been found that if the rollers are positioned about three inches from the rails the best results are obtained, though under some circumstances a greater or less distance may be desirable. After the truck has jumped off the rails the rollers will engage the track and will act as wheels for the truck and will at the same time open the air brake system for applying the brakes. Ordinarily by this construction and arrangement the train will be stopped before the truck has entirely left the track and under any circumstance the train will be stopped in the shortest possible time as immediately upon the derailing of any truck the air brake system is put into operation so that even though one or more of the cars should leave the track the train will be promptly stopped.

What I claim is:

1. In a safety apparatus for cars, a roller mounted above the track on each truck, and means connecting the roller with the air brake system for permitting the roller upon the rotation thereof to open the air brake system and apply the brakes.

2. In a safety appliance for cars, an air brake system, a roller adapted to engage the track on the derailment of the truck, a valve in the air brake system, and means connected to said roller and engaging said valve whereby upon the rotation of said roller said valve will be opened and the brakes of the air brake system applied.

3. In an emergency apparatus for trucks, a plurality of rollers mounted on said trucks and positioned above the rails and extending on each side thereof, a crank connected to said rollers, an air brake system, a valve interposed in said air brake system and arranged to be engaged by said crank whereby upon the derailment of the truck and the rotation of said roller on the rails said valve will be opened by said crank and the brakes of the air brake system applied.

4. In an emergency apparatus for cars, a plurality of rollers that are restricted centrally, rotatably mounted on said trucks, and extending on each side of the rail, an air brake system, a valve for each of the rollers interposed in said air brake system, and means connecting the rollers with said valves whereby upon the derailment of the truck and the rotation of the rollers on the rails the valves will be opened for applying the brakes on the air brake system.

In testimony whereof I affix my signature in presence of two witnesses.

JOHN L. BERING.

Witnesses:
 WM. HENRY,
 JOHN L. FLETCHER.